J. E. ANDERSON.
REEL CONNECTION.
APPLICATION FILED OCT. 13, 1911.
1,035,936.
Patented Aug. 20, 1912.
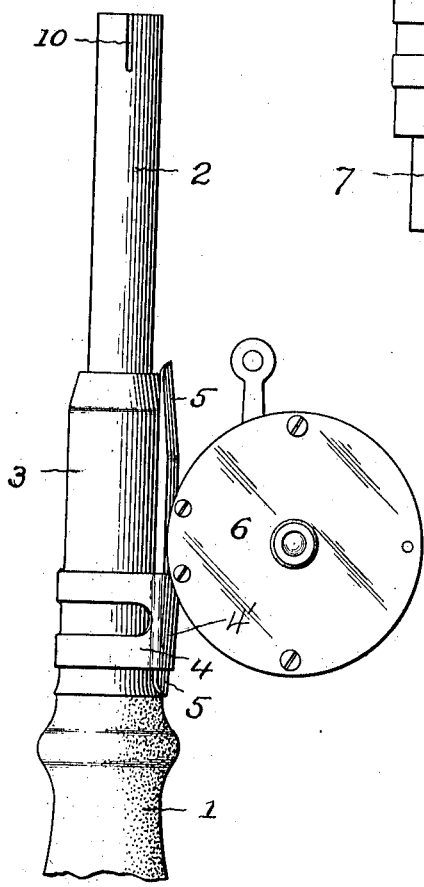
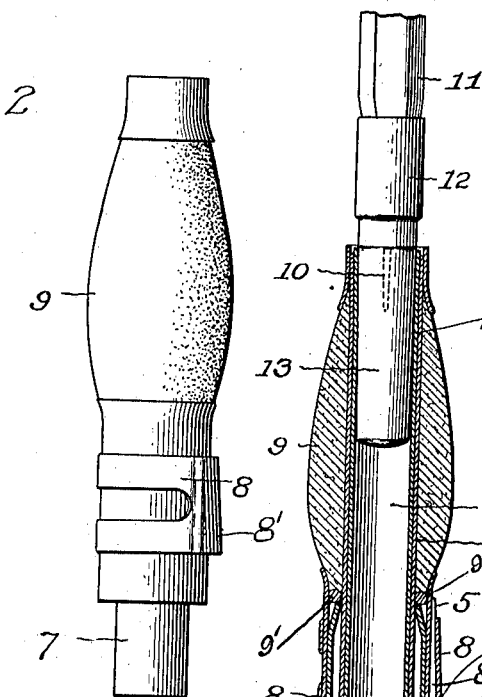
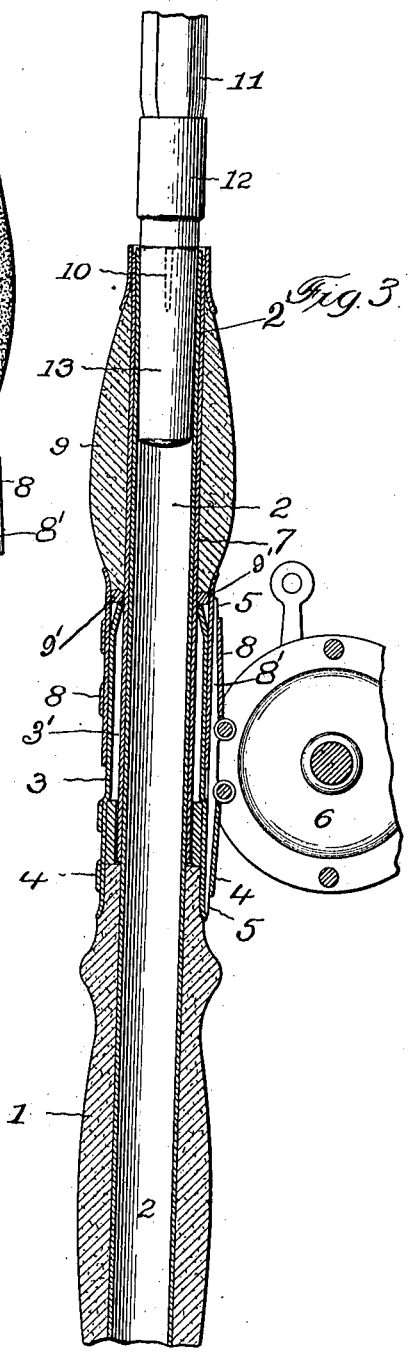
Inventor:
John E. Anderson,
by Robert Burns,
Atty.

UNITED STATES PATENT OFFICE.

JOHN E. ANDERSON, OF CHICAGO, ILLINOIS.

REEL CONNECTION.

1,035,936.  Specification of Letters Patent.  Patented Aug. 20, 1912.

Application filed October 13, 1911. Serial No. 654,511.

*To all whom it may concern:*

Be it known that I, JOHN E. ANDERSON, a citizen of the United States of America, and a resident of Chicago, in the county of Cook, State of Illinois, have invented certain new and useful Improvements in Reel Connections, of which the following is a specification.

This invention relates to means for detachably connecting the line reels to the grip ends of fishing poles, and has for its object to provide a simple, durable and efficient structural formation and combination of parts whereby a very substantial attachment of the reel to the rod is effected in a ready and convenient manner, and which at the same time permits of a like ready and convenient detachment of the reel when required, all as will hereinafter more fully appear.

In the accompanying drawings:—Figure 1, is a detail side elevation of the handle section of a fishing rod, to which the present improvement is applied. Fig. 2, is a similar view of the sliding section. Fig. 3, is a longitudinal central section, illustrating the parts in assembled relation.

Similar numerals of reference indicate like parts in the several views.

Referring to the drawings, 1 represents the main section of the fishing rod handle, which in the present improvement has a central tubular tenon 2, of some length, and which carries at its lower end the usual hand grip of cork or the like, and at its middle portion, and above said hand grip, a fixed concentric outer sleeve 3, providing an annular socket 3' for the purpose hereinafter stated. The sleeve 3 in turn carries the usual lower band 4 formed with the usual segmental socket 4' to receive and hold one end of the base member 5, of an ordinary line reel 6, as shown in Fig. 1.

7 is the sliding section of the fishing rod handle, formed with a tubular central portion or bore which fits and is slidable on the upper portion of the tubular tenon 2 of the main section 1, aforesaid, to afford an extended bearing between the parts, and in the preferred construction, as shown in Fig. 1, the lower tubular end of the sliding section 7 is housed in the aforesaid annular socket formed in the main section 1, by the outer sleeve 3 thereof. Said construction affords a strong and compact arrangement of the parts.

8 is the usual upper band encircling the sliding section 7 and formed with the usual segmental socket 8' for the reception of an end of the base member 5 of the line reel 6, aforesaid, and in connection with the before described lower band 4 of the main section 1 provides a very efficient means for engaging and holding the aforesaid base member of the line reel.

9 is a grip of cork or the like encompassing the sliding section 7, for convenience in effecting the required sliding movement of said section upon the tubular tenon 2 of the main section 1 in effecting an attachment of the line reel to the fishing rod handle, and in effecting a subsequent removal of said reel.

9' is a collar or ring arranged at the lower end of the cork grip 9 aforesaid, to hold the same in place.

A material feature of the present invention consists in forming the upper end of the tubular tenon 2 with a tapering counterbore 2', and in connection therewith with a series of longitudinal slits 10 for the purpose of rendering said tenon end expansible.

11 is the lower joint of a fishing rod having a ferrule 12 fixed on its lower end, and which ferrule in turn carries a tapering shank 13, adapted to fit the tapering counterbore of the tubular tenon 2 aforesaid. The construction being such that as the shank 13 is pushed into place in the tapering counterbore of the tenon 2, it will cause the upper end of said tenon to expand within the tubular center or bore of the sliding section 7, and cause a firm clamping together of the two sections of the handle against longitudinal separation.

Having thus fully described my said invention what I claim as new and desire to secure by Letters Patent, is:—

1. A reel connection for fishing rods, comprising a main handle section, an expansible tenon at one end of the same, a tubular section slidable on said tenon, means for expanding said tenon within the slidable section, and means on the respective sections for engaging and holding a line reel, substantially as set forth.

2. A reel connection for fishing rods, comprising a main handle section, a tubular tenon at one end of the same and formed with a tapering counterbore and longitudinal slits at its free end, a tubular section slidable on said tenon, a fishing rod section having a tapering shank at one end adapted to effect an expansion of the aforesaid free end of the tenon within the slidable section, and means on the respective sections for engaging and holding a line reel, substantially as set forth.

Signed at Chicago, Illinois, this 10th day of October 1911.

JOHN E. ANDERSON.

Witnesses:
 ROBERT BURNS,
 CHAS. KRAUTER.

Copies of this patent may be obtained for five cents each, by addressing the "Commissioner of Patents, Washington, D. C."